(12) United States Patent
Hsieh et al.

(10) Patent No.: US 11,825,009 B2
(45) Date of Patent: Nov. 21, 2023

(54) IN-VEHICLE ENTERTAINMENT SYSTEM HAVING FUNCTIONALITY OF OPERATION INTERFACE SWITCHABLE

(71) Applicant: PROLIFIC TECHNOLOGY INC., Taipei (TW)

(72) Inventors: Hsing-Yun Hsieh, Changhua (TW); Ting-Ta Chien, Taichung (TW); Ren-Yuan Yu, Hsinchu County (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 26 days.

(21) Appl. No.: 17/692,182

(22) Filed: Mar. 11, 2022

(65) Prior Publication Data
US 2022/0303385 A1  Sep. 22, 2022

(30) Foreign Application Priority Data
Mar. 17, 2021 (TW) .................................. 110109513

(51) Int. Cl.
*H04W 4/48* (2018.01)
*H04M 1/72409* (2021.01)

(52) U.S. Cl.
CPC ....... *H04M 1/724098* (2022.02); *H04W 4/48* (2018.02)

(58) Field of Classification Search
CPC .......................... H04M 1/724098; H04W 4/48
See application file for complete search history.

(56) References Cited

U.S. PATENT DOCUMENTS

| 9,645,962 B2* | 5/2017 | Voto .................... G06F 13/385 |
| 11,010,321 B2* | 5/2021 | Whittington ........ G06F 13/4022 |
| 2012/0142367 A1* | 6/2012 | Przybylski .............. H04W 4/44 455/456.1 |
| 2021/0173532 A1* | 6/2021 | Van der Keere ... G06F 3/04847 |

FOREIGN PATENT DOCUMENTS

| TW | 201901455 | 1/2019 |
| TW | M592840 | 4/2020 |
| TW | I700926 | 8/2020 |

OTHER PUBLICATIONS

Search Report for foreign counterpart application TW110109513, dated Dec. 9, 2021.
(English translation) Search Report for foreign counterpart application TW110109513, dated Dec. 9, 2021.

* cited by examiner

*Primary Examiner* — Sam Bhattacharya

(57) ABSTRACT

An in-vehicle entertainment system having functionality of operation interface switchable is disclosed. The system comprises an in-vehicle host electronic device and a hub having a host-to-host transmission function. After at least two mobile electronic devices are coupled to the hub, the in-vehicle host electronic device firstly prioritizes a communication order between the two mobile electronic devices, and then lets a display unit show an operation interface (like CarPlay operation interface) corresponding to the mobile electronic device that is prioritized with a first ranked communication order. Moreover, in case of a peripheral electronic device being coupled to the hub as well as the display unit being showing the operation interface, the in-vehicle host electronic device is allowed to access a peripheral electronic device through the hub.

13 Claims, 7 Drawing Sheets

IN-VEHICLE ENTERTAINMENT SYSTEM HAVING FUNCTIONALITY OF OPERATION INTERFACE SWITCHABLE

BACKGROUND OF THE INVENTION

1. Field of the Invention

The present invention relates to the technology field of in-vehicle entertainment host devices, and more particularly to an in-vehicle entertainment system having functionality of operation interface switchable.

2. Description of the Prior Art

With advanced development of mobile communication technologies of 4G and 5G, automobile entertainment device having multi functions of multimedia playing, touchable operation and vehicle navigation has become one of the standard devices integrated in an automobile (car). For facilitating driver be able to use the application programs (apps) installed in his smartphone by operating the automobile entertainment device or display the images, audios and/or videos stored in his smartphone by a display screen of the automobile entertainment device, Google company has proposed a specific system called Android Auto that allows the display screen of the automobile entertainment device to display content of the driver's smartphone. It is known that, Apple Inc. has also proposed a system similar to the Android Auto, called Apple CarPlay.

FIG. 1 shows a front view of an iOS smartphone and an automobile (in-vehicle) entertainment device. Moreover, FIG. 2 illustrates a block diagram of the iOS smartphone and the automobile entertainment device. As FIG. 1 and FIG. 2 show, the currently-commercial automobile entertainment device 1x principally comprises: a main controller unit 10x, a display unit 11x, a wireless communication unit 12x, an audio unit 13x, an input unit 14x, a device connection unit 15x, an Apple Mfi authentication chip 16x, and a CarPlay executing unit 17x (i.e., application program).

As FIG. 1 and FIG. 2 shows, after the iOS smartphone 2x is communicated with the automobile entertainment device 1x through a communication channel 3x, the CarPlay executing unit 17x is authorized by the Apple Mfi authentication chip so as to enable a CarPlay operation interface 1Cx be shown on a display screen of the display unit 11x. Therefore, by operating the CarPlay operation interface 1Cx, images, audios and/or videos stored in the driver's iOS smartphone can be displayed by the display unit 11x. Moreover, because some of application program installed in the iOS smartphone 2x would be mapped from the iOS smartphone 2x onto the CarPlay operation interface 1Cx, the driver is also allowed to use some of apps installed in his iOS smartphone by operating the CarPlay operation interface 1Cx.

As explained in more detail below, the forgoing communication channel 3x can be a wireless transmission interface or a wired transmission interface. On the other hand, for facilitating the data transmission between an external electronic device and the automobile entertainment device 1x, the commercial automobile entertainment device 1x is commonly equipped with two or more USB connectors (i.e., the device connection unit 15x). However, it is a pity that, once there is one USB connector is electrically connected with the driver's iOS smartphone 2x, the CarPlay operation interface 1Cx will be shown on the display screen of the display unit 11x. In such case, the main controller unit 10x of the commercial automobile entertainment device 1x is unable to access the external electronic device (e.g., USB flash drive) that is electrically connected to another one USB connector of the automobile entertainment device 1x. Moreover, in case of there are two iOS smartphones respectively connected to two USB connectors of the automobile entertainment device 1x, only one of the two iOS smartphones be allowed to map its Apps on the CarPlay operation interface 1Cx that is shown on the display screen of the display unit 11x.

From above descriptions, it is understood that, how to make the automobile entertainment device 1x having functionality of operation interface switchable will become an important issue for the manufacturers of the automobile entertainment device 1x. When the automobile entertainment device 1x is designed to have functionality of operation interface switchable, users is allowed to select any one of two iOS smartphones that are electrically connected to the automobile entertainment device 1x to map Apps on the CarPlay operation interface 1Cx that is shown in the display screen of the automobile entertainment device 1x. In view of that, inventors of the present application have made great efforts to make inventive research and eventually provided an in-vehicle entertainment system having functionality of operation interface switchable.

SUMMARY OF THE INVENTION

The primary objective of the present invention is to disclose an in-vehicle entertainment system having functionality of operation interface switchable, wherein the system comprises an in-vehicle host electronic device and a hub having a host-to-host transmission function. After at least two mobile electronic devices are coupled to the hub, the in-vehicle host electronic device firstly prioritizes a communication order between the two mobile electronic devices, and then lets a display unit show an operation interface (like CarPlay operation interface) corresponding to the mobile electronic device that is prioritized with a first ranked communication order. Moreover, in case of a peripheral electronic device being coupled to the hub as well as the display unit being showing the operation interface, the in-vehicle host electronic device is allowed to access a peripheral electronic device through the hub.

Moreover, the in-vehicle host electronic device lets the display unit show a manual menu providing a plurality of device selecting options, thereby optionally making the operation interface executing unit let one operation interface according to one of multi mobile electronic devices that are electrically connected to the hub be shown on the display unit after one corresponding device selecting option from the manual menu device list is pressed.

In order to achieve the primary objective of the present invention, inventors of the present invention provides an embodiment of the in-vehicle entertainment system having functionality of operation interface switchable, comprising:
   an in-vehicle host electronic device, comprising a first USB host unit, a display unit and an operation interface executing unit; and
   a first hub having a host-to-host transmission function, comprising: an upstream port coupled to the first USB host unit, a hub function module coupled to the upstream port and a plurality of downstream ports coupled to the hub function module;
   wherein the first hub is configured to performs a plurality of functions, comprising:

in case of a first mobile electronic device having a first operating system is coupled to a first downstream port in the plurality of downstream ports, the first hub making the first mobile electronic device be communicated with the in-vehicle host electronic device via the hub function module, such that the operation interface executing unit lets a first operation interface according to the first mobile electronic device be shown on the display unit; and during the first operation interface being normally working, the first hub allowing the in-vehicle host electronic device to access a peripheral electronic device that is coupled to a second downstream port in the plurality of downstream ports via the hub function module.

In one embodiment, there is a device information recording unit provided in the in-vehicle host electronic device, and the device information recording unit being configured for establishing a device list and a plurality of device connection records after the first mobile electronic device, the peripheral electronic device, and a second mobile electronic device having a second operating system are respectively coupled to the first downstream port, the second downstream port, and a third downstream port in the plurality of downstream ports.

In a practicable embodiment, the device list comprising a plurality of device information comprising USB address, number of times of connecting with the first hub, and operating system version.

In one embodiment, the hub function module comprises an USB signal transmitting unit and an USB/NCM protocol conversion unit.

In one embodiment, there is a priority sequencing unit provided in the in-vehicle host electronic device, and the priority sequencing unit is configured for prioritizing a communication order between the first mobile electronic device and the second mobile electronic device after the first mobile electronic device and the second mobile electronic device are coupled to the first downstream port and the third downstream port based on the device list and the device connection records.

In a practicable embodiment, the in-vehicle host electronic device lets the display unit show a manual menu according to the device list, such that a plurality of device selecting options corresponding to the first mobile electronic device coupled to the first downstream port and the second mobile electronic device coupled to the third downstream port are shown in the manual menu, thereby optionally making the operation interface executing unit enable the first operation interface according to the first mobile electronic device or a second operation interface according to second mobile electronic device to be shown on the display unit after one corresponding device selecting option from the device list is pressed.

In one embodiment, in case of the first mobile electronic device and the second mobile electronic device being respectively coupled to the first downstream port and the third downstream port, the first hub lets the first mobile electronic device that is prioritized with a first ranked communication order be communicated with the first USB host unit through the USB/NCM protocol conversion unit of the hub function module and the upstream port thereof, such that the operation interface executing unit lets the first operation interface according to the first mobile electronic device be shown on the display unit.

In one embodiment, in case of the first operation interface being normally working, the first hub allowing the in-vehicle host electronic device to access the peripheral electronic device through the USB signal transmitting unit and the second downstream port.

In a practicable embodiment, the first hub is integrated in the in-vehicle host electronic device, and each of the plurality of downstream ports is an electrical connector exposed out of a front panel of the in-vehicle host electronic device.

In another one practicable embodiment, the first hub and the in-vehicle host electronic device are two devices independent from each other.

In one embodiment, the in-vehicle entertainment system further comprises a second hub having a host-to-host transmission function, wherein the second hub also comprises one upstream port coupled to the first USB host unit, one hub function module coupled to the upstream port and a plurality of downstream ports coupled to the hub function module, and the second hub is coupled to one of the plurality of downstream ports of the first hub by the upstream port thereof.

In a practicable embodiment, the in-vehicle host electronic device further comprising a second USB host unit, and the in-vehicle entertainment system further comprises a second hub having a host-to-host transmission function, wherein the second hub also comprises one upstream port coupled to the first USB host unit, one hub function module coupled to the upstream port and a plurality of downstream ports coupled to the hub function module, wherein the second hub is coupled to the second USB host unit of the in-vehicle host electronic device by the upstream port thereof In one embodiment, an external display device with a touch screen is allowed to be electrically connected to the in-vehicle host electronic device. In case of a third mobile electronic device having a third operating system is coupled to one of the downstream ports of the second hub, the operation interface executing unit lets a third operation interface according to the third mobile electronic device be shown on a display screen of the display device.

In a practicable embodiment, each of the first operating system, the second operating system and the third operating system is selected from the group consisting of iOS operating system and Android operating system.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an in-vehicle entertainment system having functionality of operation interface switchable disclosed by the present invention, embodiments of the present invention will be described in detail with reference to the attached drawings hereinafter.

First Embodiment

Figure 1:
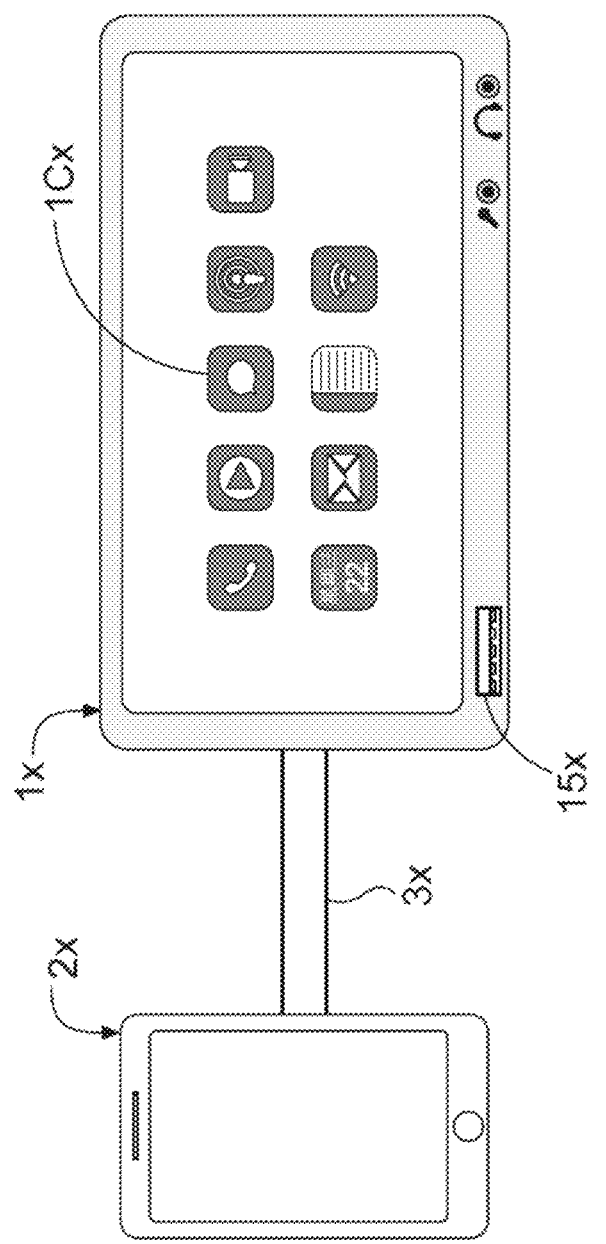
FIG. 1 shows a front view of an iOS smartphone and an automobile (in-vehicle) entertainment device.
Figure 2:
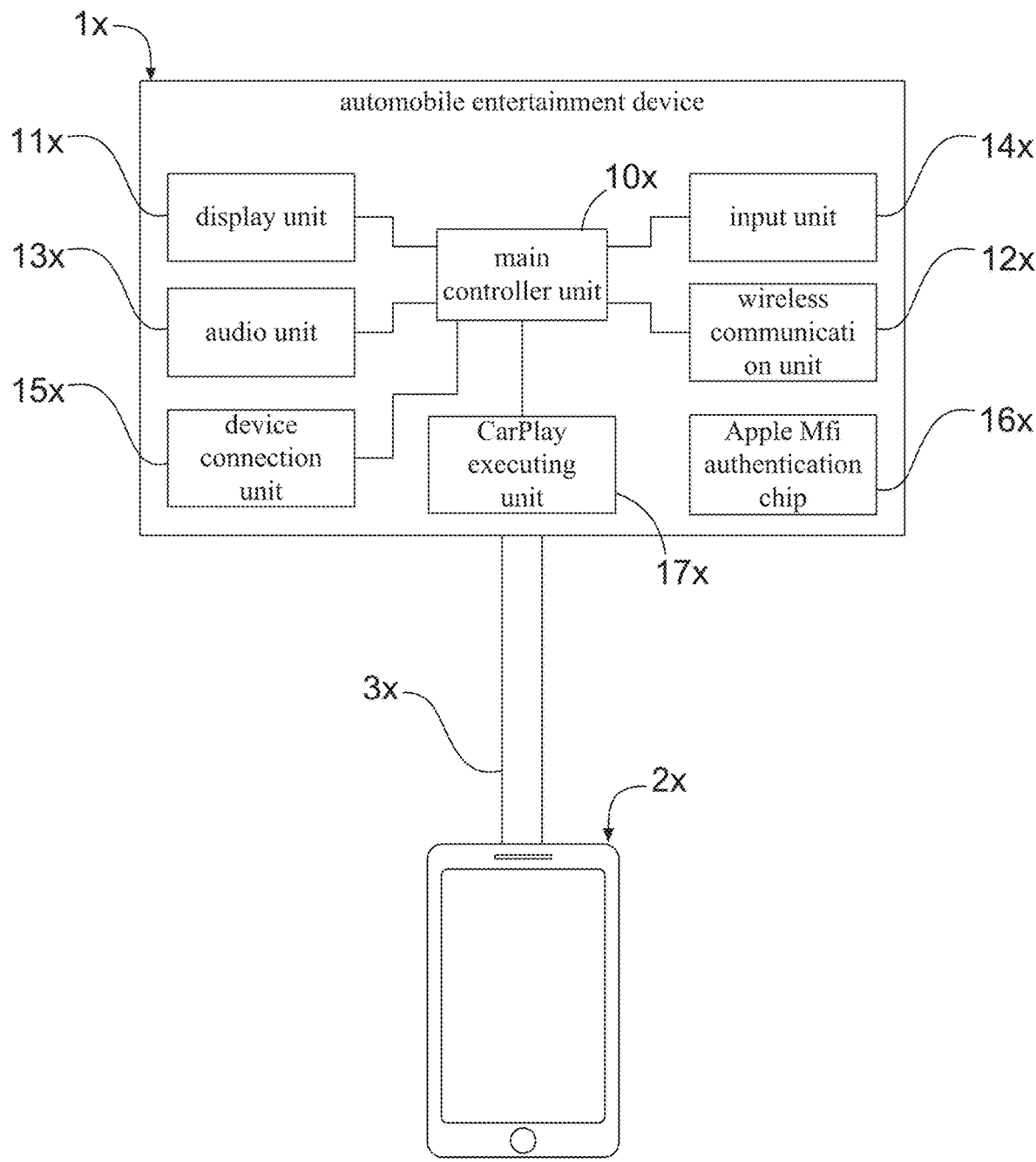
FIG. 2 shows a block diagram of the iOS smartphone and the automobile entertainment device.
Figure 3:
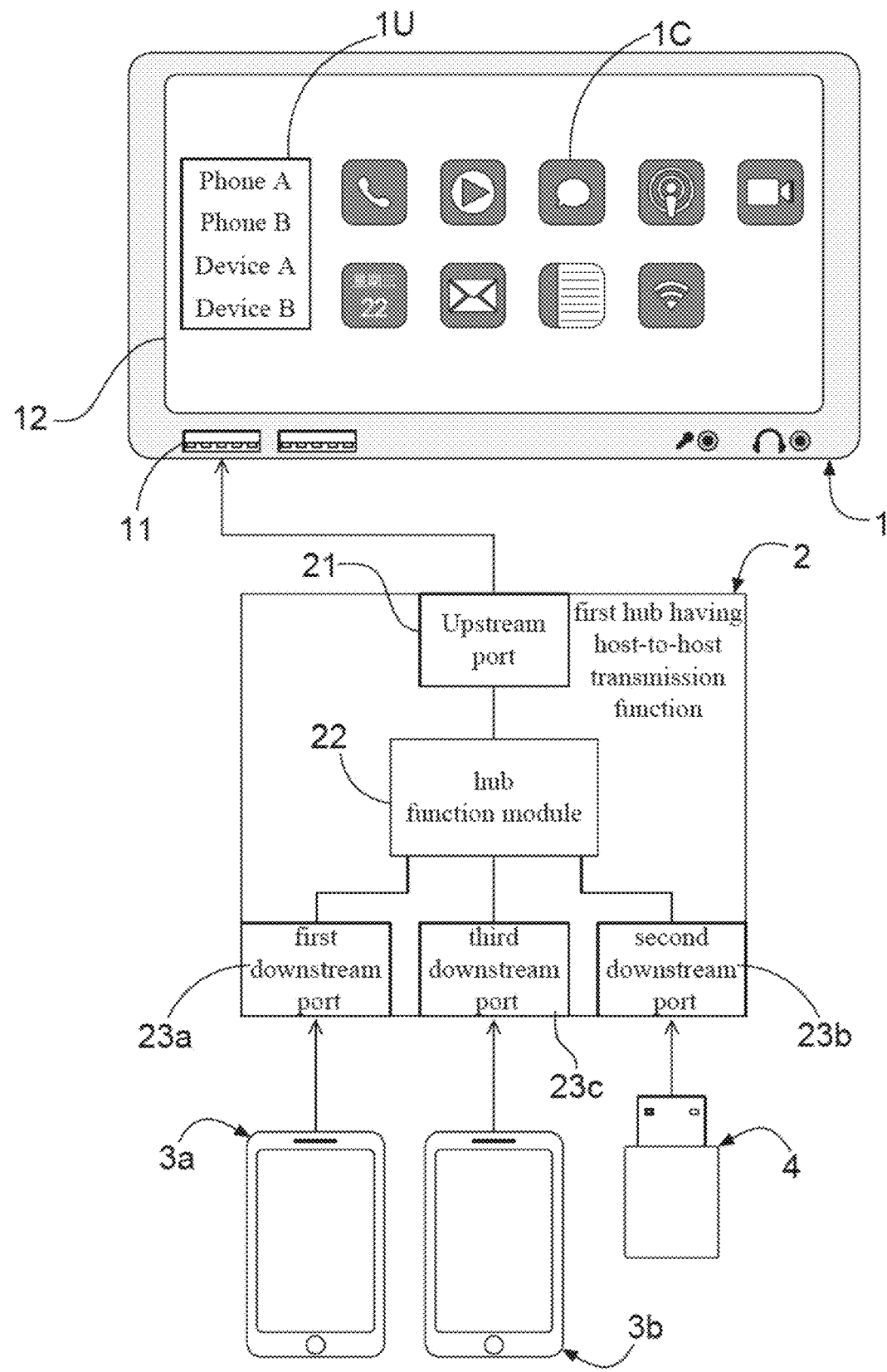
FIG. 3 shows a first framework view of an in-vehicle entertainment system having functionality of operation interface switchable according to the present invention.
Figure 4:
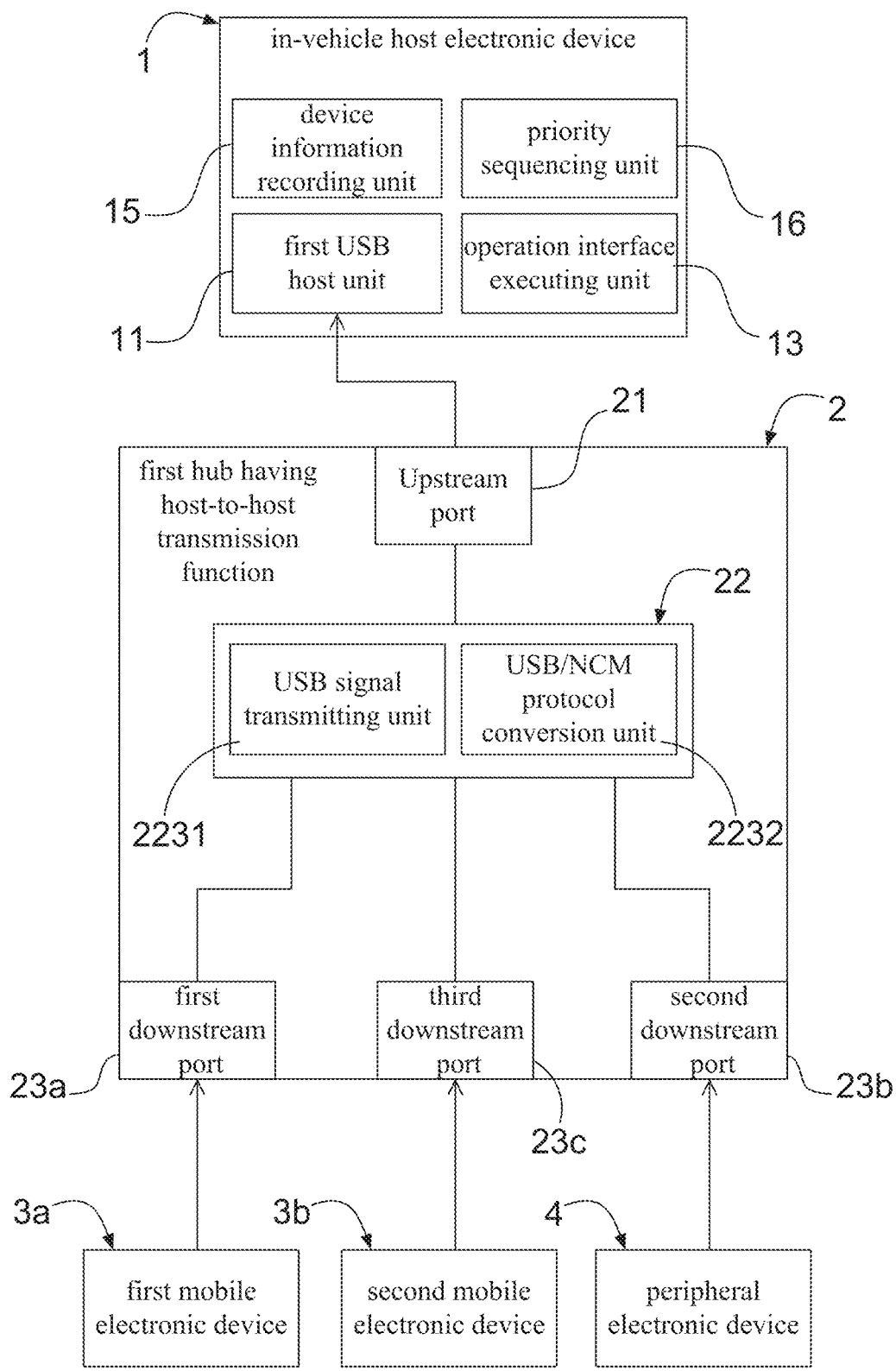
FIG. 4 shows a block diagram of the in-vehicle entertainment system having functionality of operation interface switchable according to the present invention.

FIG. 3 shows a first framework view of an in-vehicle entertainment system having functionality of operation interface switchable according to the present invention. Moreover, FIG. 4 illustrates a block diagram of the in-vehicle entertainment system. According to one embodiment of the present invention, the in-vehicle entertainment system having functionality of operation interface switchable comprises an in-vehicle host electronic device 1 and a first hub 2 having a host-to-host transmission function. It needs to explain that, although FIG. 3 and FIG. 4 merely depict that the in-vehicle host electronic device 1 is provided with a first USB host unit 11, a display unit 12 and an operation interface executing unit 13, it should be known that the commercial automobile (in-vehicle) entertainment device (as shown in FIG. 2) commonly comprises a main controller unit, a display unit, a wireless communication unit, an audio unit, an input unit, a device connection unit, an Apple Mfi authentication chip, and a CarPlay executing unit (i.e., application program).

According to one embodiment of the present invention, the first hub 2 comprises:

an upstream port 21 coupled to the first USB host unit 11, a hub function module 22 coupled to the upstream port 21 and a plurality of downstream ports (23a, 23b, 23c) coupled to the hub function module 22. In which, an amount number of the plurality of downstream ports is N (N≥2). For example, FIG. 3 depicts that the plurality of downstream ports consist of a first downstream port 23a, a second downstream port 23b and a third downstream port 23c.

Figure 5:
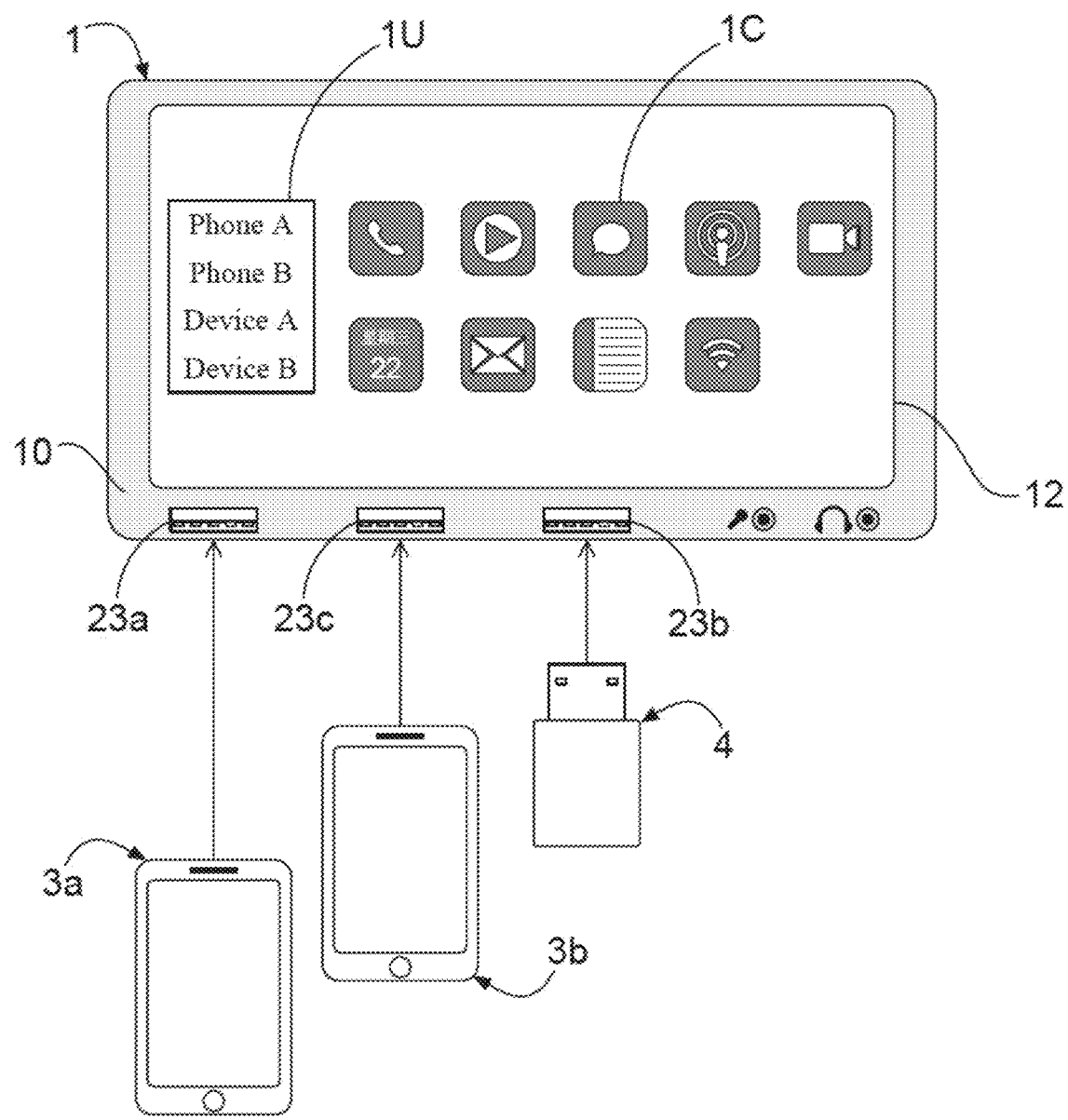
FIG. 5 shows a front view of an in-vehicle host electronic device that is integrated with a hub having a host-to-host transmission function therein.

Continuously referring to FIG. 3, and please simultaneously refer to FIG. 5 showing a front view of the in-vehicle host electronic device that is integrated with the first hub. From FIG. 3, it is reasonably to consider that the first hub 2 and the in-vehicle host electronic device 1 are two devices independent from each other. In such case, the first USB host unit 11 can be a USB connector integrated with a USB host chip therein. However, as FIG. 5 shows, when really carrying out the in-vehicle entertainment system of the present invention, the first hub 2 can also be integrated in the in-vehicle host electronic device 1. In such case, each of the plurality of downstream ports (23a, 23b, 23c) is an electrical connector exposed out of a front panel of the in-vehicle host electronic device 1, and the first USB host unit is an USB host chip.

As FIG. 3 and FIG. 4 shows, there is a device information recording unit 15 provided in the in-vehicle host electronic device 1, and the device information recording unit 15 is configured for establishing a device list and a plurality of device connection records after a first mobile electronic device 3a having a first operating system, a peripheral electronic device 4, and a second mobile electronic device 3b having a second operating system are respectively coupled to the first downstream port 23a, the second downstream port 23b, and the third downstream port 23c. In a practicable embodiment, the device list comprising a plurality of device information comprising: USB address, number of times of connecting with the first hub 2, and operating system version.

Particularly, there is a priority sequencing unit 16 provided in the in-vehicle host electronic device 1. According to the present invention, after the first mobile electronic device 3a and the second mobile electronic device 3b are coupled to the first downstream port 23a and second downstream 23b, a device list and a plurality of device connection records are established by the device information recording unit 15, and the priority sequencing unit 16 is enabled to prioritize a communication order between the first mobile electronic device 3a and the second mobile electronic device 3b based on the device list and the device connection records. Therefore, in case of the first mobile electronic device 3a and the second mobile electronic device 3b are respectively coupled to the first downstream port 23a and the third downstream port 23c, the first hub 2 lets the first mobile electronic device 3a that is prioritized with a first ranked communication order be communicated with the in-vehicle host electronic device 1, such that the operation interface executing unit 13 lets a first operation interface 1C according to the first mobile electronic device 3a be shown on the display unit. Therefore, by operating the first operation interface 1C, images, audios and/or videos stored in the first mobile electronic device 3a (e.g., iOS smartphone) can be displayed by the display unit 12. Moreover, because some of application program installed in the first mobile electronic device 3a would be mapped from the first mobile electronic device 3a onto the first operation interface 1C, users are allowed to use some of apps installed in his first mobile electronic device 3a (e.g., iOS smartphone) by operating the operation interface 1C.

From FIG. 3 and FIG. 4, it is found that the hub function module 22 comprises an USB signal transmitting unit 2231 and an USB/NCM protocol conversion unit 2231. As explained in more detail below, in case of the first mobile electronic device 3a and the second mobile electronic device 3b are electrically connected to the first hub 2, the first hub 2 lets the first mobile electronic device 3a that is prioritized with a first ranked communication order be communicated with the first USB host unit 11 of the in-vehicle host electronic device 1 through the USB/NCM protocol conversion unit 2232 of the hub function module 22 and the upstream port 21 thereof, such that the operation interface executing unit 13 lets the first operation interface 1C according to the first mobile electronic device 3a be shown on the display unit 12. In other words, because data transmission is achieved between the in-vehicle host electronic device 1 and the first mobile electronic device (iOS smartphone) 3a through NCM (Network Control Model) protocol during the first operation interface 1C being normally working, the USB/NCM protocol conversion unit 2232 (i.e., a CDC/NCM bridge unit) is particularly provided in the hub function module 22, so as to let a data transmitted from the first mobile electronic device 3a based on USB CDC protocol be further transmitted to the in-vehicle host electronic device 1 based on NCM protocol.

It is worth mentioning that, because the first hub 2 has a host-to-host transmission function, the first hub 2 allows the in-vehicle host electronic device 1 to access the peripheral electronic device 4 through the USB signal transmitting unit 2232 of the hub function module 22 and the second downstream port 22b thereof during the first operation interface 1C being normally working.

As FIG. 3 shows, after the device list is established, the in-vehicle host electronic device 1 lets the display unit 12 show a manual menu 1U according to the device list, such that a plurality of device selecting options corresponding to the first mobile electronic device 3a (i.e., phone A) coupled to the first downstream port 23a and the second mobile electronic device 3b (i.e., phone B) coupled to the third downstream port 23c are shown in the manual menu 1U, thereby optionally making the operation interface executing unit 13 enable the first operation interface 1C according to the first mobile electronic device 3a or a second operation interface (2C) according to second mobile electronic device 3b to be shown on the display unit 12 after one corresponding device selecting option from the manual menu 1U is pressed.

For example, during some of application program installed in the first mobile electronic device 3a being mapped on the first operation interface 1C, users are allowed to press "phone B" from the manual menu 1U, so as to make the operation interface executing unit 13 lets a second operation interface (2C) according to the second mobile electronic device 3b be shown on the display unit 12. Therefore, by operating the second operation interface (2C), images, audios and/or videos stored in the second mobile electronic device 3b (i.e., user's another one smartphone) can be displayed by the display unit 12. Moreover, because some of application program installed in the second mobile electronic device 3b would be mapped on the second operation interface users are also allowed to use some of apps installed in second mobile electronic device 3b by operating the second operation interface (2C).

In a practicable embodiment, both the first operating system and the second operating system can be an iOS operating system or an Android operating system. In other words, if the first mobile electronic device 3a and the second mobile electronic device 3b are an iOS smartphone and an Android smartphone, respectively, the forgoing first operation interface is CarPlay operation interface, and the forgoing second operation interface is Android Auto operation interface.

Second Embodiment

Figure 6:
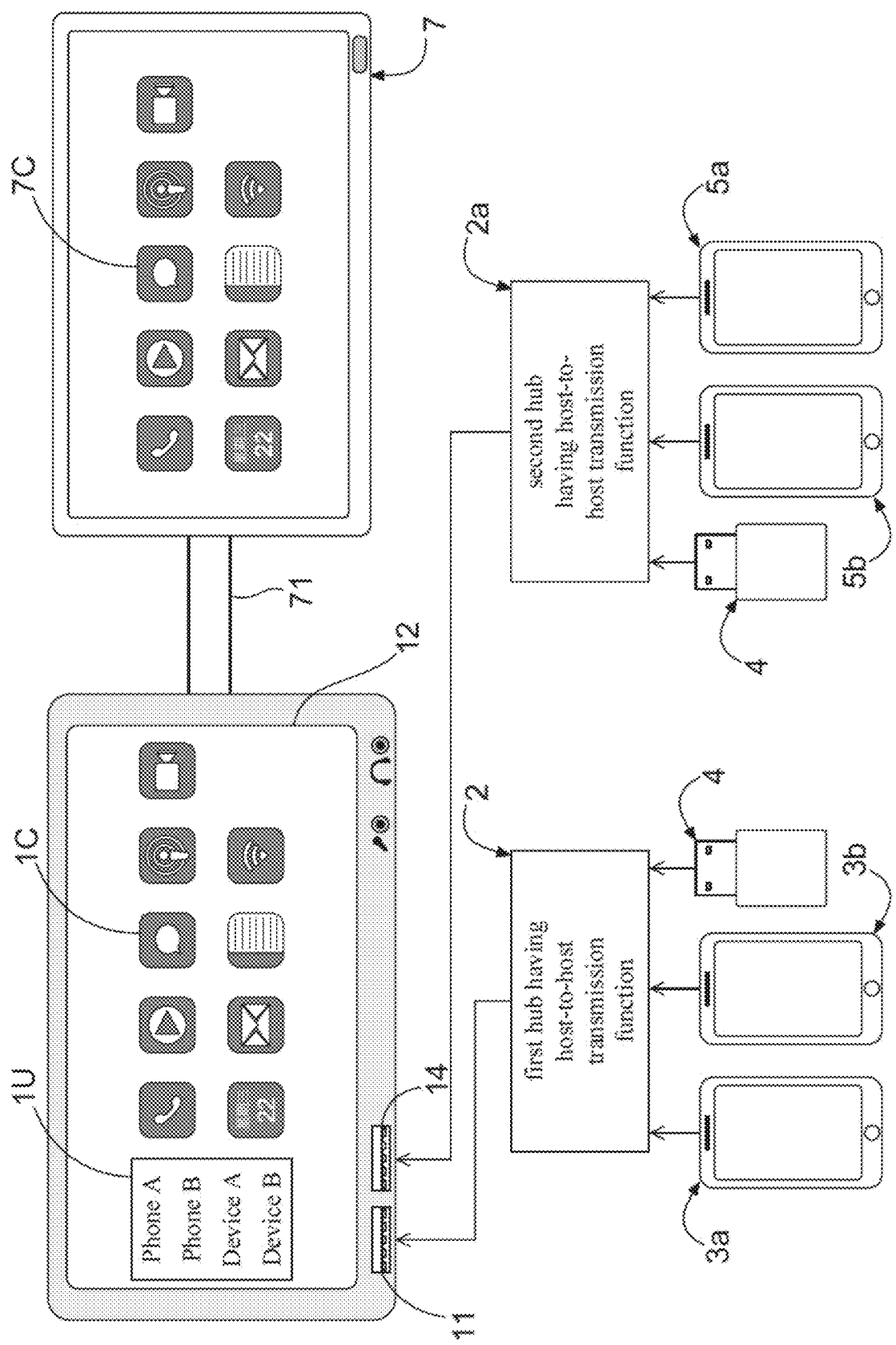
FIG. 6 shows a second framework view of the in-vehicle entertainment system having functionality of operation interface switchable according to the present invention.

FIG. 6 shows a second framework view of the in-vehicle entertainment system having functionality of operation interface switchable. In second embodiment, the in-vehicle entertainment system further comprises a second hub 2a, and the in-vehicle host electronic device 1 further comprising a second USB host unit 14. The second hub 2a also has a host-to-host transmission function. Moreover, the same to the first hub 2 (as shown in FIG. 4), the second hub 2a also comprises one upstream port 21 coupled to the first USB host unit 11 of the in-vehicle host electronic device 1, one hub function module 22 coupled to the upstream port 21 and a plurality of downstream ports (23a, 23b, 23c) coupled to the hub function module 22. As FIG. 6 shows, the second hub 2a is coupled to the second USB host unit 14 of the in-vehicle host electronic device 1 by the upstream port 21 thereof.

By such arrangement, after an external display device 7 with a touch screen being electrically connected to the in-vehicle host electronic device 1 as well as a third mobile electronic device 5a having a third operating system and a fourth mobile electronic device 5b having a fourth operating system are respectively coupled to two of the downstream ports of the second hub 2a, a device list and a plurality of device connection records are established by the device information recording unit 15, and the priority sequencing unit 16 is enabled to prioritize a communication order between the third mobile electronic device 5a and the fourth mobile electronic device 5b based on the device list and the device connection records. As a result, the operation interface executing unit 13 lets a second operation interface 7C according to the third mobile electronic device 5a be shown on the display unit 12 because the third mobile electronic device 5a is prioritized with a first ranked communication order by the priority sequencing unit 16.

As FIG. 6 shows, after the device list is established, the in-vehicle host electronic device 1 lets the display unit 12 show a manual menu 1U according to the device list, such that a plurality of device selecting options corresponding to the first mobile electronic device 3a, the second mobile electronic device 3b, the third mobile electronic device 5a, and the fourth mobile electronic device 5b are shown in the manual menu 1U. Therefore, after one corresponding device selecting option from the manual menu 1U is pressed, it is able to optionally make the operation interface executing unit 13 enable the first operation interface 1C according to the first mobile electronic device 3a or the second mobile electronic device 3b to be shown on the display unit 12 or enable the second operation interface 7C according to the third mobile electronic device 5a or the fourth mobile electronic device 5b to be shown on a display screen of the external display device 7.

Third Embodiment

Figure 7:
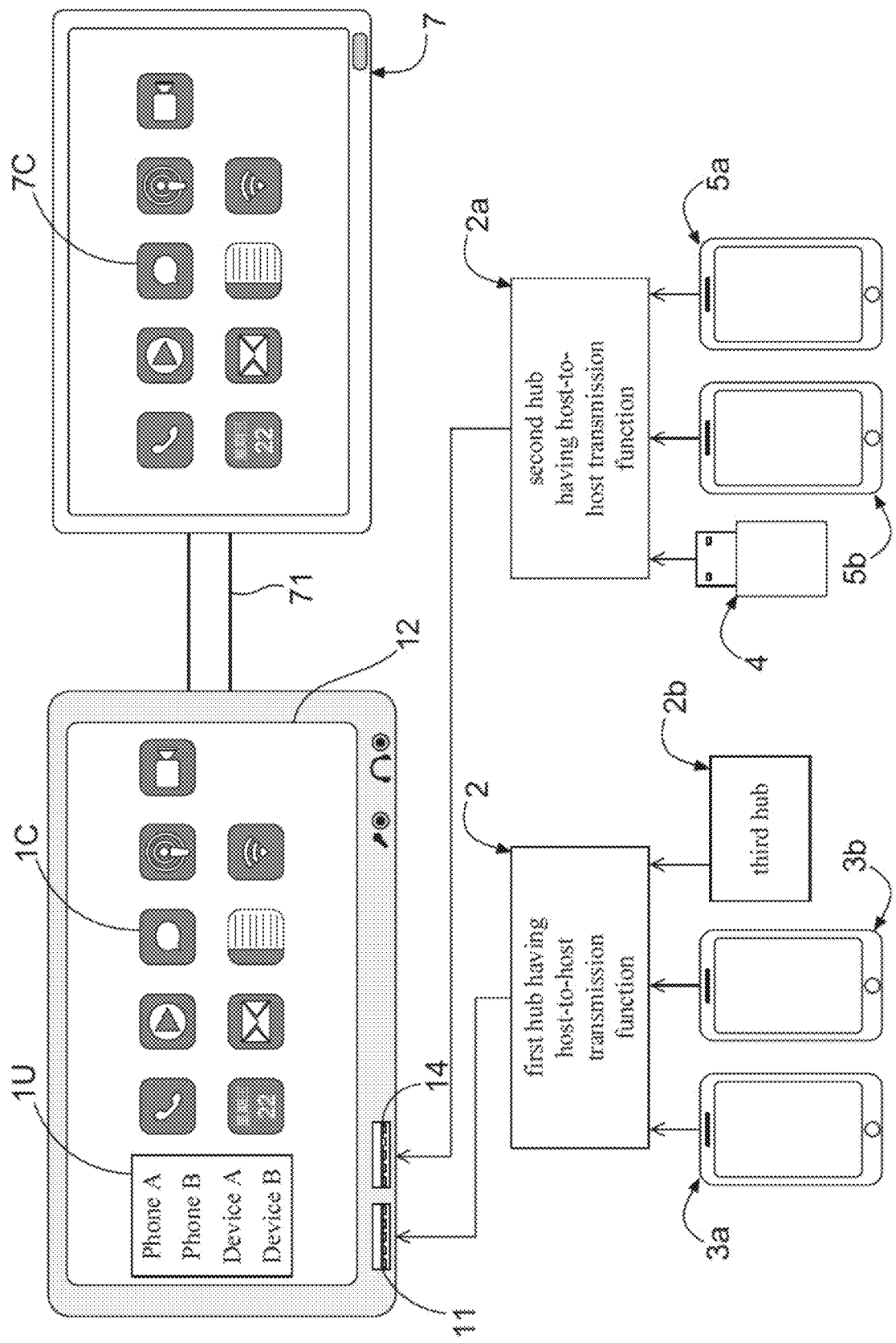
FIG. 7 shows a third framework view of the in-vehicle entertainment system having functionality of operation interface switchable according to the present invention.

FIG. 7 shows a third framework view of the in-vehicle entertainment system having functionality of operation interface switchable. In third embodiment, the in-vehicle entertainment system comprises an in-vehicle host electronic device 1, a first hub 2 having host-to-host transmission function, a second hub 2a having host-to-host transmission function, and a third hub 2b having host-to-host transmission function. In which, the third hub 2b is coupled to one of the plurality of downstream ports of the first hub 2 by a upstream port 21 thereof.

Therefore, through above descriptions, all embodiments and their constituting elements of the in-vehicle entertainment system having functionality of operation interface switchable according to the present invention have been introduced completely and clearly. The above description is made on embodiments of the present invention. However, the embodiments are not intended to limit scope of the present invention, and all equivalent implementations or alterations within the spirit of the present invention still fall within the scope of the present invention.

What is claimed is:

1. An in-vehicle entertainment system having functionality of operation interface switchable, comprising:
   an in-vehicle host electronic device, comprising a first USB host unit, a display unit and an operation interface executing unit; and
   a first hub having a host-to-host transmission function, comprising: an upstream port coupled to the first USB host unit, a hub function module coupled to the upstream port and a plurality of downstream ports coupled to the hub function module;
   wherein there is a device information recording unit provided in the in-vehicle host electronic device, and the device information recording unit being configured for establishing a device list and a plurality of device connection records after a first mobile electronic device, a peripheral electronic device, and a second mobile electronic device having a second operating system are respectively coupled to a first downstream port, a second downstream port, and a third downstream port in the plurality of downstream ports;

wherein the plurality of device connection records comprising: USB address, number of times of connecting with the first hub, and operating system version;

wherein there is a priority sequencing unit provided in the in-vehicle host electronic device, and the priority sequencing unit being configured for prioritizing a communication order between the first mobile electronic device and the second mobile electronic device after the first mobile electronic device and the second mobile electronic device are coupled to the first downstream port and the third downstream port based on the device list and the plurality of device connection records that includes said number of times of connecting with the first hub;

wherein the first hub is configured to perform a plurality of functions, comprising:

in case of the first mobile electronic device having a first operating system is coupled to a first downstream port in the plurality of downstream ports, the first hub making the first mobile electronic device in communication with the in-vehicle host electronic device via the hub function module, such that the operation interface executing unit makes a first operation interface according to the first mobile electronic device be shown on the display unit;

during the first operation interface being normally working, the first hub making the in-vehicle host electronic device be able to access a peripheral electronic device that is coupled to a second downstream port in the plurality of downstream ports via the hub function module; and in case of the first mobile electronic device and the second mobile electronic device being respectively coupled to the first downstream port and the third downstream port in the same time, the first hub making the first mobile electronic device that is prioritized with a first ranked communication order be in communication with the first USB host unit through the hub function module and the upstream port, such that the operation interface executing unit makes the first operation interface according to the first mobile electronic device be shown on the display unit.

2. The in-vehicle entertainment system of claim 1, wherein the hub function module comprises an USB signal transmitting unit and an USB/NCM protocol conversion unit.

3. The in-vehicle entertainment system of claim 1, wherein the in-vehicle host electronic device makes the display unit show a manual menu according to the device list, such that a plurality of device selecting options corresponding to the first mobile electronic device coupled to the first downstream port and the second mobile electronic device coupled to the third downstream port are shown in the manual menu, thereby optionally making the operation interface executing unit enable the first operation interface according to the first mobile electronic device or a second operation interface according to the second mobile electronic device to be shown on the display unit after one corresponding device selecting option from the manual menu is pressed.

4. The in-vehicle entertainment system of claim 1, wherein in case of the first operation interface being normally working, the in-vehicle host electronic device being able to access the peripheral electronic device through the USB signal transmitting unit of the first hub and the second downstream port.

5. The in-vehicle entertainment system of claim 1, wherein the first hub is integrated in the in-vehicle host electronic device, and each of the plurality of downstream ports being an electrical connector exposed out of a front panel of the in-vehicle host electronic device.

6. The in-vehicle entertainment system of claim 1, wherein the first hub and the in-vehicle host electronic device are two devices independent from each other.

7. The in-vehicle entertainment system of claim 1, wherein the first hub is integrated in the in-vehicle host electronic device.

8. The in-vehicle entertainment system of claim 1, further comprising a second hub having a host-to-host transmission function, wherein the second hub also comprises one upstream port coupled to the first USB host unit, one hub function module coupled to the upstream port and a plurality of downstream ports coupled to the hub function module, and the second hub being coupled to one of the plurality of downstream ports of the first hub by the upstream port thereof.

9. The in-vehicle entertainment system of claim 1, wherein the in-vehicle host electronic device further comprising a second USB host unit.

10. The in-vehicle entertainment system of claim 9, further comprising a second hub having a host-to-host transmission function, wherein the second hub also comprises one upstream port coupled to the first USB host unit, one hub function module coupled to the upstream port and a plurality of downstream ports coupled to the hub function module, and the second hub being coupled to the second USB host unit of the in-vehicle host electronic device by the upstream port thereof.

11. The in-vehicle entertainment system of claim 10, wherein an external display device with a touch screen is allowed to be electrically connected to the in-vehicle host electronic device.

12. The in-vehicle entertainment system of claim 11, wherein in case of a third mobile electronic device having a third operating system is coupled to one of the downstream ports of the second hub, the operation interface executing unit letting a third operation interface according to the third mobile electronic device be shown on a display screen of the display device.

13. The in-vehicle entertainment system of claim 12, wherein each of the first operating system, the second operating system and the third operating system is selected from the group consisting of iOS operating system and Android operating system.

* * * * *